(12) United States Patent
Zhu et al.

(10) Patent No.: US 11,186,670 B2
(45) Date of Patent: Nov. 30, 2021

(54) POLYOL SYSTEM FOR PREPARING POLYURETHANE

(71) Applicant: COVESTRO INTELLECTUAL PROPERTY GMBH & CO. KG, Leverkusen (DE)

(72) Inventors: Erika Zhu, Shanghai (CN); Ling Shi, Shanghai (CN); Hua Lu, Shanghai (CN); Jun Li, Shanghai (CN); Chenxi Zhang, Shanghai (CN)

(73) Assignee: COVESTRO INTELLECTUAL PROPERTY GMBH & CO. KG, Leverkusen (DE)

( * ) Notice: Subject to any disclaimer, the term of this patent is extended or adjusted under 35 U.S.C. 154(b) by 129 days.

(21) Appl. No.: 16/466,221

(22) PCT Filed: Dec. 22, 2017

(86) PCT No.: PCT/EP2017/084288
§ 371 (c)(1),
(2) Date: Jun. 3, 2019

(87) PCT Pub. No.: WO2018/122144
PCT Pub. Date: Jul. 5, 2018

(65) Prior Publication Data
US 2020/0062886 A1 Feb. 27, 2020

(30) Foreign Application Priority Data

Dec. 28, 2016 (CN) .......................... 201611272597.0

(51) Int. Cl.
| | | |
|---|---|---|
| *C08L 75/12* | (2006.01) | |
| *C08L 75/08* | (2006.01) | |
| *C08G 18/50* | (2006.01) | |
| *C08G 18/38* | (2006.01) | |
| *C08G 18/32* | (2006.01) | |
| *C08G 18/48* | (2006.01) | |
| *C08G 18/66* | (2006.01) | |
| *C08G 18/75* | (2006.01) | |
| *C08G 18/76* | (2006.01) | |

(52) U.S. Cl.
CPC ....... *C08G 18/3206* (2013.01); *C08G 18/324* (2013.01); *C08G 18/3228* (2013.01); *C08G 18/3234* (2013.01); *C08G 18/4804* (2013.01); *C08G 18/5021* (2013.01); *C08G 18/6677* (2013.01); *C08G 18/6685* (2013.01); *C08G 18/75* (2013.01); *C08G 18/76* (2013.01); *C08G 2120/00* (2013.01); *C08G 2125/00* (2013.01)

(58) Field of Classification Search
None
See application file for complete search history.

(56) References Cited

U.S. PATENT DOCUMENTS

| | | | | |
|---|---|---|---|---|
| 5,208,269 | A | * 5/1993 | Brown | ...................... C08K 7/10 521/125 |
| 5,302,303 | A | * 4/1994 | Clatty | .................. C08G 18/168 252/182.24 |
| 5,614,575 | A | 3/1997 | Kotschwar | |
| 5,750,583 | A | * 5/1998 | Gansen | .............. C08G 18/4018 521/78 |
| 2007/0142601 | A1 | 6/2007 | Nodelman | |

FOREIGN PATENT DOCUMENTS

| | | |
|---|---|---|
| CN | 101503566 A | 8/2009 |
| CN | 102369228 A | 3/2012 |
| EP | 0125677 A2 | 11/1984 |
| EP | 0268906 A2 | 6/1988 |
| WO | WO2011085775 A1 | 7/2011 |
| WO | 2012015583 A1 | 2/2012 |

OTHER PUBLICATIONS

International Search Report for PCT/EP2017/084288 dated Apr. 11, 2018.
Written Opinion of the International Searching Authority for PCT/EP2017/084288 dated Apr. 11, 2018.
International Preliminary Report on Patentability for International Application No. PCT/EP2017/084288 dated Jul. 2, 2019.

* cited by examiner

*Primary Examiner* — Michael J Feely
(74) *Attorney, Agent, or Firm* — K&L Gates LLP

(57) ABSTRACT

The present application discloses a polyol system for preparing polyurethane comprising: i) at least one active chain extender having at least two groups that can react with an isocyanate, wherein at least one group that can react with an isocyanate is free primary —NH2 group; ii) at least one active chain extender having three groups that can react with an isocyanate, wherein at least one group that can react with an isocyanate is free primary —OH group, and iii) at least one polyether polyol starting from an amine. The polyol system according to the present disclosure is phase-stable without layering and capable of releasing mold quickly after reacting with an isocyanate to produce polyurethane.

15 Claims, No Drawings

POLYOL SYSTEM FOR PREPARING POLYURETHANE

CROSS-REFERENCE TO RELATED APPLICATIONS

This application is a U.S. national stage application, filed under 35 U.S.C. § 371, of International Application No. PCT/EP2017/084288, which was filed on Dec. 22, 2017, and which claims priority to Chinese Patent Application No. 201611272597.0, which was filed on Dec. 28, 2016. The contents of each are incorporated by reference into this specification.

TECHNICAL FIELD

The present invention belongs to the polyurethane field. Specifically, it relates to a polyol system for preparing polyurethane, a polyurethane system comprising the same and a polyurethane product prepared therefrom.

BACKGROUND

Polyurethane shows various properties and applications, for example in fibers (especially elastic fibers), elastomers, coatings, adhesives, soft and rigid foams, artificial leathers and the like.

More and more polyurethane composites have been used as internal components in the automobile industry since polyurethane is characterized by light weight and high stiffness. Polyurethane sandwich components which are produced by covering a core layer with a reinforcing layer have been known for a long time. Typically, reinforcing glass fibers are used as the covering material and honeycomb paperboards are used as the core material. Natural fibers and other reinforcing materials can also be used for reinforcing, and other materials such as rigid foams, aluminum honeycomb panels, EPS foams can also be used as the core materials. Generally, polyurethane reaction mixture is applied to one side, and in most cases, both sides of the "sandwich semi-finished product", and then the component covered with the polyurethane reaction mixture is put into a mold at a certain temperature. The polyurethane reaction mixture is cured in the mold and thus the article is manufactured. Then the polyurethane sandwich component thus obtained is released from the mold and the product is taken out.

The polyurethane reaction mixture generally comprises an isocyanate component and a polyol component that can react with an isocyanate to produce polyurethane. Mold-release agents are usually added to the polyol systems since suppliers expect the polyol systems to obtain self-release property, and therefore, most polyol systems in the market suffer from phase separation. Such polyol systems with phase separation put additional burdens on the users since they have to mix the polyol systems with phase separation for about 1 hour before using them so as to obtain uniform polyol systems. This additional mixing leads to a waste of time, thus reducing the production efficiency.

Therefore, there is a need for such a polyol system for preparing polyurethane that can avoid an additional mixing step of polyols, and is capable of releasing mold quickly after reacting with an isocyanate to produce polyurethane without sticking the mold, thus obtaining high-quality product while improving production efficiency.

SUMMARY

The object of the present invention consists in providing a polyol system for preparing polyurethane, which can be in the form of a stable homogeneous phases during storage without an additional step of mixing polyol, and is capable of releasing mold quickly after reacting with an isocyanate to produce polyurethane, thus production efficiency can be improved.

Objects of the present invention are achieved by the following technical solutions.

According to a first aspect of the present invention, there is provided a polyol system for preparing polyurethane, comprising:
i) at least one active chain extender having at least two groups that can react with an isocyanate, wherein at least one group that can react with an isocyanate is free primary —NH$_2$ group;
ii) at least one active chain extender having three groups that can react with an isocyanate, wherein at least one group that can react with an isocyanate is free primary —OH group; and
iii) at least one polyether polyol starting from an amine.

According to another aspect of the present invention, there is provided a polyurethane system comprising an isocyanate component and a polyol component, characterized in that, the polyol component is the polyol system described above.

According to another aspect of the present invention, there is provided a polyurethane product, comprising the reaction product obtained by reacting the polyurethane system described above.

The polyol system according to the present invention is phase-stable and has self-mold release properties. It releases mold quickly after reacting with an isocyanate to produce polyurethane. Users can utilize the polyol system directly without additional further mixing. The polyurethane system according to the present invention can reduce the mold-release time from more than 150 seconds which is common in the art to below 120 seconds, even to 60 seconds. This polyol system as well as polyurethane system comprising it can avoid an additional mixing step, saving labor cost, while increasing production efficiency due to quick mold-release. Since the polyol system is phase-stable, it can avoid manufacturing unqualified components resulting from phase separation and insufficient stirring beforehand. The polyurethane product according to the present invention can be widely used in the automotive filed, e.g., as spare tire coverplate, sunroof pulling plate, etc. due to its light weight and high strength.

DETAILED DESCRIPTION

Specific embodiments of the present invention are described hereinafter.

According to a first aspect of the present invention, there is provided a polyol system for preparing polyurethane, comprising:
i) at least one active chain extender having at least two groups that can react with an isocyanate, wherein at least one group that can react with an isocyanate is free primary —NH$_2$ group;
ii) at least one active chain extender having three groups that can react with an isocyanate, wherein at least one group that can react with an isocyanate is free primary —OH group, and
iii) at least one polyether polyol starting from an amine.

The polyol system further comprises a basic polyether polyol, for example a polyether polyol with a functionality of 2-4, preferably of 2-3 and a hydroxyl value of 300~600 mg KOH/g, such as M9158 available from Covestro Polymers (China) Company Limited hydroxyl value thereof is 475 KOH/g, NJ4502 available from Jurong Ningwu New Material Co. Ltd hydroxyl value thereof is 450 KOH/g, and DC380 available from Dongchang company hydroxyl value thereof is 380 KOH/g, and the like.

The basic polyether polyol is present in the polyol system according to the present invention in an amount of 50-80 parts by weight, preferably 55-75 parts by weight, more preferably 60-70 parts by weight, based on that the total weight of the polyol system is 100 parts by weight.

The polyol system can further comprise one or more additives conventionally used in the field selected from: foaming agents, foam stabilizers, catalysts, mold-release agents, flame retardants, color pastes, fillers, stabilizers, thixotropic agents and the like.

The group that can react with an isocyanate of the at least one active chain extender having at least two groups that can react with an isocyanate (wherein at least one group that can react with an isocyanate is free primary —$NH_2$ group), other than the free primary —$NH_2$ group, is selected from for example primary- (secondary-) amino group, hydroxyl group, thiol group, urea group, epoxy group and the like.

The at least one active chain extender having at least two groups that can react with an isocyanate (wherein at least one group that can react with an isocyanate is free primary —$NH_2$ group) is preferably selected from the group consisting of alkanolamines having 2-12 carbon atoms, such as ethanolamine, 2-aminopropanol and 3-amino-2,2-dimethylpropanol; aliphatic (cyclic) diamines having 2-15 carbon atoms, such as 1,2-ethylenediamine, 1,3-propanediamine, 1,3-butanediamine, 1,4-butanediamine, 1,6-hexanediamine, isophorone diamine, 1,4-cyclohexanediamine and 4,4'-diaminodicyclohexylmethane; and aromatic diamines having 6-12 carbon atoms, such as 2,4- and 2,6-toluenediamines; one or more hydrogen atoms attached to carbon atoms in the alkanolamines, aliphatic (cyclic) diamines and aromatic diamines are optionally substituted by an alkyl group comprising 1-6, preferably 1-4 carbon atoms.

The active chain extender having at least two groups that can react with an isocyanate (wherein at least one group that can react with an isocyanate is free primary —$NH_2$ group) used in the polyol system according to the present invention is preferably aromatic diamine, such as E100 (3,5-diethyl-toluenediamine, DETDA) available from Albemarle Corporation.

The at least one active chain extender having at least two groups that can react with an isocyanate is present in the polyol system according to the present invention in an amount of 1-25 parts by weight, preferably 1-20 parts by weight, preferably 2-15 parts by weight, more preferably 2-10 parts by weight, most preferably 2-6 parts by weight, based on that the total weight of the polyol system is 100 parts by weight.

The group that can react with an isocyanate of the at least one active chain extender having three groups that can react with an isocyanate (wherein at least one group that can react with an isocyanate is free primary —OH group), other than the free primary —OH group, is selected from hydroxyl group, urea group, thiol group and the like.

The at least one active chain extender having three groups that can react with an isocyanate (wherein at least one group that can react with an isocyanate is free primary —OH group) is preferably selected from trihydric alcohols having 3-8 carbon atoms, such as glycerol, 1,2,6-hexanetriol, and trimethylolpropane. In the case of trimethylolpropane, pre-melting with heat is required.

The at least one active chain extender having three groups that can react with an isocyanate is present in the polyol system according to the present invention in an amount of 1-20 parts by weight, preferably 2-15 parts by weight, more preferably 3-15 parts by weight, based on that the total weight of the polyol system is 100 parts by weight.

The polyether polyol starting from an amine is selected from polyether polyols starting from ethylenediamine and with a hydroxyl value of 450 KOH/g to 800 KOH/g, such as ED750 starting from ethylenediamine and with a hydroxyl value of 750 KOH/g, available from KUKDO company, Desmophen 4050E starting from ethylenediamine and with a hydroxyl value of 630 KOH/g, available from Covestro Polymers (China) Company Limited.

The polyether polyol starting from an amine is present in the polyol system according to the present invention in an amount of 1-10 parts by weight, preferably 2-8 parts by weight, more preferably 2-6 parts by weight, based on that the total weight of the polyol system is 100 parts by weight.

In a preferred embodiment of the polyol system according to the present invention, based on weight, the ratio between the active chain extender having at least two groups that can react with an isocyanate (wherein at least one group that can react with an isocyanate is free primary —$NH_2$ group), the at least one active chain extender having three groups that can react with an isocyanate (wherein at least one group that can react with an isocyanate is free primary —OH group) and the polyether polyol starting from an amine is 1:0.8~8:0.8~5, preferably 1:1~7:1~3, more preferably 1:1~5:1~2, and most preferably 1:1~3:1~2.

The foaming agent can be any foaming agent that is known to be used for preparing polyurethane, including chemical foaming agents and/or physical foaming agents. By chemical foaming agent, one means a compound that produce gaseous products by reacting with an isocyanate. Examples of such foaming agents include water or carboxylic acids. By physical foaming agent, one means a compound that has been emulsified or dissolved in the raw materials for preparing polyurethane and evaporates under the condition of forming polyurethane. Examples of such foaming agents include hydrocarbons, halogenated hydrocarbons or other compounds, for example perfluoroalkanes such as perfluoroethane, chlorofluorocarbons, and ethers, ketones, esters and/or acetals. Water is preferably used as the foaming agent in the present invention.

The foaming agent is present in the polyol system according to the present invention in an amount of 0-15 parts by weight, preferably 0-10 parts by weight, more preferably 0-5 parts by weight, based on that the total weight of the polyol system is 100 parts by weight.

The foam stabilizer is selected from silicone oils, such as B8411 and B8870 available from Evonik Industries.

The foam stabilizer is present in the polyol system according to the present invention in an amount of 0-5 parts by weight, preferably 0.1-4 parts by weight, more preferably 0.1-3 parts by weight, based on that the total weight of the polyol system is 100 parts by weight.

The catalyst is any conventional catalyst that is used to catalyze the reaction of polyol and isocyanate to prepare polyurethane. Examples of catalysts used are organometallic compounds, preferably the following: organotin compounds, for example stannous(II) salts of organic carboxylic acids such as stannous acetate, stannous octoate, stannous 2-ethylhexanoate and stannous laurate; dialkyltin(IV) salts of organic carboxylic acids such as dibutyltin diacetate, dibutyltin dilaurate, dibutyltin maleate and dioctyltin diacetate; bismuth salts of carboxylic acids, such as bismuth(III)

neodecanoate, bismuth 2-ethylhexanoate and bismuth octoate; or mixtures thereof. Other suitable catalysts include amine catalysts with strong alkalinity. Examples of the amines include amidines, such as 2,3-dimethyl-3,4,5,6-tetrahydropyrimidine; tertiary amines, such as triethylamine, tributylamine, dimethylbenzylamine, N-methylmorpholine, N-ethylmorpholine and N-cyclohexylmorpholine, N,N,N',N'-tetramethylethylenediamine, N,N,N',N'-tetra methylbutanediamine, N,N,N',N'-tetrannethylhexanediannine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane, and preferably 1,4-diazabicyclo[2,2,2]octane; and alkanolamine compounds, such as triethanolamine, triisopropanolamine, N-methyldiethanolamine and N-ethyldiethanolamine, as well as dimethylethanolamine. The catalyst can be used alone or as a mixture. For example, PU1748, available from Covestro Polymers (China) Company Limited can be used.

The catalyst is present in the polyol system according to the present invention in an amount of 0-8 parts by weight, preferably 0-5 parts by weight, more preferably 0-3 parts by weight, based on that the total weight of the polyol system is 100 parts by weight.

The mold-release agent is selected from pentaerythritol oleate and other long chain fatty acids such as oleic acid.

The mold-release agent is present in the polyol system according to the present invention in an amount of 0-15 parts by weight, preferably 0-10 parts by weight, more preferably 0-7 parts by weight, based on that the total weight of the polyol system is 100 parts by weight.

Other additives that may be added to the polyol system according to the present invention such as flame retardants, color pastes, fillers, stabilizers and thixotropic agents can be added in conventional amounts in the polyurethane field.

According to another aspect of the present invention, there is provided a polyurethane system comprising an isocyanate component and a polyol component, and the polyol component is the polyol system described above.

The isocyanate component has a functionality of 1.2-3.0, preferably 1.5-3.0 and particularly preferably 2.0-2.8.

The isocyanate component is selected from (i) aliphatic isocyanates, such as hexamethylene diisocyanate; (ii) cycloaliphatic isocyanates, such as isophorone diisocyanate, 1,4-cyclohexane diisocyanate, 1-methyl-2,4-cyclohexane diisocyanate, 1-methyl-2,6-cyclohexane diisocyanate, 4,4'-dicyclohexylnnethane diisocyanate, 2,4'-dicyclohexylmethane diisocyanate and 2,2'-dicyclohexylmethane diisocyanate; and (iii) aromatic isocyanates, such as 2,4-toluene diisocyanate, 2,6-toluene diisocyanate, 4,4'-diphenylmethane diisocyanate, 2,4'-diphenylmethane diisocyanate, 2,2'-diphenylmethane diisocyanate and 1,5-naphthalene diisocyanate.

The isocyanate component preferably used in the present invention is aromatic isocyanate. Preferably, the aromatic isocyanate with a general formula R(NCO)z is used, wherein R is a polyvalent organic group with one aromatic system and z is an integer of at least 2.

Examples of the aromatic isocyanate include: 4,4'-diisocyanato benzene, 1,3-diisocyanato o-xylene, 1,3-diisocyanato p-xylene, 1,3-diisocyanato m-xylene, 2,4-diisocyanato-1-chlorobenzene, 2,4-diisocyanato-1-nitrobenzene, 2,5-diisocyanato-1-nitrobenzene, m-phenylene diisocyanate, p-phenylene diisocyanate, 2,4-toluene diisocyanate, 2,6-toluene diisocyanate, a mixture of 2,4- and 2,6-toluene diisocyanates, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylyl diisocyanate, 3,3-dimethyl-4,4'-diphenylmethane diisocyanate, and 3,3'-dimethyldiphenylmethane-4,4'-diisocyanate; triisocyanates, such as 4,4',4''-triphenylmethane triisocyanate and 2,4,6-toluene triisocyanate; and tetraisocyanates, such as 4,4'-dimethyl-2,2',5,5'-diphenylmethane tetraisocyanate. Toluene diisocyanate, 2,4'-diphenylmethane diisocyanate, 4,4'-diphenylmethane diisocyanate, polymethylene polyphenylene polyisocyanate and mixtures thereof are particularly preferred, for example Desmodur 44V20, available from Covestro Polymers (China) Company Limited.

The above diisocyanates can be used alone or as a mixture thereof.

Depending on the amount of the polyols in the polyol system, the amount of the isocyanate component can be adjusted by those skilled in the art. For example, the equivalent ratio between the groups that can react with an isocyanate and the isocyanate group is 1.1:1 to 5.0:1, preferably 1.1:1 to 3.0:1.

In the case that no catalyst is contained in the polyol system according to the present invention, additional catalyst is required to be added when preparing the polyurethane system according to the invention.

According to another aspect of the present invention, there is provided a polyurethane product comprising the reaction product obtained by reacting the polyurethane system described above.

The polyurethane can be prepared by employing methods well known to those skilled in the art, for example, by mixing the polyol system with the isocyanate component via a high-pressure or low-pressure machine and then heating to cure, forming a polyurethane product.

Throughout the specification, in all the cases, all the numbers that express quantity, percentage, part by weight, hydroxyl value, functionality and the like are to be understood to be modified by the term "about".

The present invention is now described in detail referring to the specific examples hereinafter. However, it should be understood that the examples here are only for illustrative purposes and the scope of the present invention is not limited thereto.

EXAMPLES

Raw Material Used in the Examples:

M9158: polyether polyol, starting from glycerol, with a hydroxyl value of 475 mgKOH/g, available from Covestro Polymers (China) Company Limited.

NJ4502: polyether polyol, starting from sorbitol, with a hydroxyl value of 450 mgKOH/g, available from Jurong Ningwu New Material Co. Ltd.

ED750: polyether polyol, starting from ethylenediamine, with a hydroxyl value of 750 mgKOH/g, starting from ethylenediamine, available from KUKDO Company.

DC380: polyether polyol, starting from sucrose, with a hydroxyl value of 380 mgKOH/g, available from Dongchang Company.

Desmophen 4050E: polyether polyol, starting from ethylenediamine, with a hydroxyl value of 630 mgKOH/g, starting from ethylenediamine, available from Covestro Polymers (China) Company Limited.

PU1748: modified amine aids, available from Covestro Polymers (China) Company Limited.

E100: 3,5-diethyltoluenediannine (DETDA), available from Albemarle Corporation.

B8411: silicone oil, available from Evonik Industries.

B8870: silicone oil, available from Evonik Industries.

Desmodur 44V20: polyisocyanate, available from Covestro Polymers (China) Company Limited.

Pentaerythritol oleate: internal mold-releasing agent, available from Jiangsu Haian Petroleum Chemical Factory.

Black Paste: color paste (black), available from Stahl.

In the following examples, contents of all components are based on parts by weight.

Example 1

Polyol systems A1-A5 according to the present invention is formulated in accordance with the parts by weight shown in Table 1:

TABLE 1

Inventive Polyol Systems A1-A5

| | A1 | A2 | A3 | A4 | A5 |
|---|---|---|---|---|---|
| M9158 | 54 | 54 | 54 | 54 | 54 |
| NJ 4502 | 10 | 10 | 10 | 10 | 10 |
| ED 750 | 6 | 6 | 6 | 6 | 6 |
| Glycerol | 3 | 7 | 10 | 12 | 15 |
| E100 | 2 | 2 | 2 | 2 | 2 |
| PU 1748 | 10 | 10 | 10 | 10 | 10 |
| Pentaerythritol Oleate | 4 | 4 | 4 | 4 | 4 |
| B8411 | 0.5 | 0.5 | 0.5 | 0.5 | 0.5 |
| Water | 0.5 | 0.5 | 0.5 | 0.5 | 0.5 |

Comparative polyol systems B1-B5 beyond the scope of the present invention is formulated in accordance with the parts by weight shown in Table 2:

TABLE 2

Comparative Polyol Systems B1-B5

| | B1 | B2 | B3 | B4 | B5 |
|---|---|---|---|---|---|
| M9158 | 54 | 54 | 54 | 54 | 54 |
| NJ 4502 | 10 | 10 | 10 | 10 | 10 |
| ED 750 | 6 | 6 | 6 | 6 | 6 |
| BDO | 3 | 7 | 10 | 12 | 15 |
| E100 | 2 | 2 | 2 | 2 | 2 |
| PU 1748 | 10 | 10 | 10 | 10 | 10 |
| Pentaerythritol Oleate | 4 | 4 | 4 | 4 | 4 |
| B8411 | 0.5 | 0.5 | 0.5 | 0.5 | 0.5 |
| Water | 0.5 | 0.5 | 0.5 | 0.5 | 0.5 |

Comparative polyol systems C1-C5 beyond the scope of the present invention is formulated in accordance with the parts by weight shown in Table 3:

TABLE 3

Comparative Polyol Systems C1-C5

| | C1 | C2 | C3 | C4 | C5 |
|---|---|---|---|---|---|
| M9158 | 61.5 | 61.5 | 61.5 | 61.5 | 61.5 |
| DC 380 | 8 | 8 | 8 | 8 | 8 |
| 4050E | 4 | 4 | 4 | 4 | 4 |
| EG | 3 | 6 | 10 | 12 | 15 |
| E100 | 2 | 2 | 2 | 2 | 2 |
| PU 1748 | 10 | 10 | 10 | 10 | 10 |
| Pentaerythritol Oleate | 4 | 4 | 4 | 4 | 4 |
| B8870 | 0.4 | 0.4 | 0.4 | 0.4 | 0.4 |
| Water | 0.5 | 0.5 | 0.5 | 0.5 | 0.5 |

Polyol systems A1-A5, comparative polyol systems B1-B5 and C1-C5 is kept at room temperature and atmospheric pressure, phase separation states are observed and rated in accordance with the following evaluation criteria:

Evaluation Criteria:
1: good, no layering after one month;
2: fair: layered after one week;
3: poor: layered within one week.

Rating results were as follows:

TABLE 4

Phase Separation States Rating

| | Polyol System No. | | |
|---|---|---|---|
| | A1-A5 | B1-B5 | C1-C5 |
| Rating | 1 | 3 | 3 |

It can be seen from Table 4 that the polyol systems A1-A5 using glycerol as chain extender all keep uniform during one month of storage, while the comparative polyol systems B1-B5 and C1-C5 using 1,4-butanediol or ethylene glycol as chain extenders were layered within one week of placement, even in the case of minor addition.

Example 2

Polyurethane systems D1-D4 according to the present invention and comparative polyurethane system E1 beyond the scope of the present invention is formulated in accordance with Table 5 and 6, and it was found that the polyol systems in D1-D4 were uniform. The polyol systems and isocyanate are mixed and spray coated onto the glass fiber mats of both upper and lower sides of a "sandwich semi-finished product" with a high-pressure spray coating system, and then this sandwich structure is put into a mold with a press of 90-140° C., and released from mold and the sandwich component is taken out after heat cured and molded.

TABLE 5

Polyurethane System D1 and Comparative Polyurethane System E1

| | Polyurethane System D1 | Comparative Polyurethane System E1 |
|---|---|---|
| M9158 | 52.8 | 52.8 |
| NJ 4502 | 10.0 | 10.0 |
| ED 750 | 6.0 | 6.0 |
| Glycerol | 10.0 | 10.0 |
| E100 | 6.0 | 0.0 |
| PU 1748 | 6.0 | 6.0 |
| Pentaerythritol Oleate | 4.0 | 4.0 |
| B8411 | 0.5 | 0.5 |
| Water | 0.7 | 0.7 |
| Black Paste | 4.0 | 4.0 |
| Desmodur 44V20 | 170.0 | 159.7 |
| Mold-release Time | 60-70 s | >150 s |

TABLE 6

Polyurethane Systems D2-D4

| | Polyurethane System D2 | Polyurethane System D3 | Polyurethane System D4 |
|---|---|---|---|
| M9158 | 56.3 | 53.3 | 49.0 |
| DC 380 | 8.0 | 10.0 | 10.0 |
| Desmophen 4050E | 4.0 | 5.0 | 10.0 |
| Glycerol | 10.0 | 10.0 | 10.0 |

TABLE 6-continued

Polyurethane Systems D2-D4

|  | Polyurethane System D2 | Polyurethane System D3 | Polyurethane System D4 |
|---|---|---|---|
| E100 | 2.0 | 2.0 | 2.0 |
| PU 1748 | 10.0 | 10.0 | 8.8 |
| Pentaerythritol Oleate | 4.0 | 4.0 | 4.0 |
| B8870 | 0.4 | 0.4 | 0.4 |
| Water | 0.3 | 0.3 | 0.3 |
| Black paste | 5.0 | 5.0 | 5.0 |
| 44V20 | 169.4 | 169.1 | 173.1 |
| Mold-release Time | ca. 120 s | 80-100 s | 75-85 s |

It can be seen from Tables 5 and 6 that polyurethane systems D1-D4 according to the present invention can achieve quick mold-releases of below 120 seconds after cured to form polyurethane products. When DETDA reached 6 parts by weight (polyurethane system D1), a quick mold-release of 60-70 seconds can be achieved.

Example 3

Tests is carried out in accordance with test standard DIN EN/310 on sandwich component (spare tire coverplate) prepared by the comparative polyurethane system E1 and the inventive polyurethane system D1 in EXAMPLE 2, and the results were summarized in Tables 7 and 8:

TABLE 7

Comparative Polyurethane System E1

| Sample No. | Sample Width b0 mm | Sample Thickness a0 mm | EMod N/mm$^2$ |
|---|---|---|---|
| 1-1 | 50.66 | 19.35 | 1434.89 |
| 1-2 | 51.36 | 19.32 | 1422.98 |
| 1-3 | 52.11 | 19.21 | 1475.36 |
| 1-4 | 48.94 | 19.19 | 1500.94 |

TABLE 8

Polyurethane System D1 according to the present invention

| Sample No. | Sample Width b0 mm | Sample Thickness a0 mm | EMod N/mm$^2$ |
|---|---|---|---|
| 2-1 | 51.27 | 19.45 | 1533.64 |
| 2-2 | 51.45 | 19.39 | 1471.14 |
| 2-3 | 52.57 | 19.25 | 1641.96 |
| 2-4 | 51.47 | 19.31 | 1597.41 |

It can be seen from the test data that the final product obtained by employing the polyurethane system of the present invention showed better physical properties than those of the final product obtained by employing the comparative polyurethane system, and they both met the demand of the market for sandwich components.

The product obtained by employing the polyurethane system according to the present invention can be widely used in the automotive filed, e.g., as spare tire coverplate, sunroof pulling plate, etc. due to its light weight and high strength, thus meeting the requirements of automotive industry for light weight and high strength.

Although some aspects of the present invention has been presented and discussed, it should be realized by those skilled in the art that various modifications can be made to the above aspects without departing from the principal and spirit of the present invention. Thus, the scope of the present invention will be defined by the claims and equivalence thereof.

What is claimed is:

1. A polyol system for preparing polyurethane comprising:
   1-25 parts by weight, based on a total 100 parts by weight of the polyol system, of i) at least one active chain extender having at least two groups that can react with an isocyanate, wherein at least one group of the at least two groups that can react with an isocyanate is a free primary —NH2 group;
   1-20 parts by weight, based on a total 100 parts by weight of the polyol system, of ii) at least one active chain extender having three groups that can react with an isocyanate, wherein at least one group of the three groups that can react with an isocyanate is a free primary —OH group, and wherein the at least one active chain extender having three groups that can react with an isocyanate is selected from trihydric alcohols having 3-8 carbon atoms;
   1-10 parts by weight, based on a total 100 parts by weight of the polyol system, of iii) at least one polyether polyol starting from an amine; and
   50-80 parts by weight, based on a total 100 parts by weight of the polyol system, of iv) a basic polyether polyol.

2. The polyol system according to claim 1, wherein the polyol system further comprises one or more additives selected from the group consisting of: foaming agents, foam stabilizers, catalysts, mold-release agents, flame retardants, color pastes, fillers, stabilizers, and thixotropic agents.

3. The polyol system according to claim 1, wherein the i) at least one active chain extender having at least two groups that can react with an isocyanate is selected from the group consisting of: alkanolamine having 2-12 carbon atoms, aliphatic (cyclic) diamine having 2-15 carbon atoms, and aromatic diamine having 6-12 carbon atoms,
   wherein one or more hydrogen atoms attached to carbon atoms in the alkanolamine, aliphatic (cyclic) diamine, and aromatic diamine are optionally substituted by an alkyl group comprising 1-6 carbon atoms.

4. The polyol system according to claim 1, wherein the i) at least one active chain extender having at least two groups that can react with an isocyanate is present in an amount of 2-15 parts by weight, based on a total 100 parts by weight of the polyol system.

5. The polyol system according to claim 1, wherein the i) at least one active chain extender having at least two groups that can react with an isocyanate is present in an amount of 2-10 parts by weight, based on a total 100 parts by weight of the polyol system.

6. The polyol system according to claim 1, wherein the i) at least one active chain extender having at least two groups that can react with an isocyanate is present in an amount of 2-6 parts by weight, based on a total 100 parts by weight of the polyol system.

7. The polyol system according to claim 1, wherein the ii) at least one active chain extender having three groups that can react with an isocyanate is present in an amount of 2-15 parts by weight, based on a total 100 parts by weight of the polyol system.

8. The polyol system according to claim 1, wherein the ii) at least one active chain extender having three groups that can react with an isocyanate is present in an amount of 3-15 parts by weight, based on a total 100 parts by weight of the polyol system.

9. The polyol system according to claim 1, wherein the iii) at least one polyether polyol starting from an amine is selected from polyether polyols starting from ethylenediamine with a hydroxyl value of 450 KOH/g to 800 KOH/g.

10. The polyol system according to claim 1, wherein the iii) at least one polyether polyol starting from an amine is present in an amount of 2-8 parts by weight, based on a total 100 parts by weight of the polyol system.

11. The polyol system according to claim 1, wherein the iii) at least one polyether polyol starting from an amine is present in an amount of 2-6 parts by weight, based on a total 100 parts by weight of the polyol system.

12. The polyol system according to claim 1, wherein the iv) basic polyether polyol is selected from polyether polyols with a hydroxyl value of 300 to 600 mg KOH/g.

13. A polyurethane system comprising an isocyanate component and a polyol component, wherein the polyol component is the polyol system according to claim 1.

14. The polyurethane system according to claim 13, wherein the isocyanate component is selected from: (i) aliphatic isocyanate, (ii) cycloaliphatic isocyanate, (iii) aromatic isocyanate, and mixtures thereof.

15. A polyurethane product comprising the reaction product obtained by reacting the polyurethane system of claim 13.

\* \* \* \* \*